UNITED STATES PATENT OFFICE.

FREDERICK D. LARABEE, OF HUTCHINSON, KANSAS, ASSIGNOR TO HIMSELF, AND WILLIAM G. ANDREWS, OF CHICAGO, ILLINOIS.

METHOD OF TREATING FLOUR.

1,136,881.

Specification of Letters Patent.  Patented Apr. 20, 1915.

No Drawing.  Application filed July 11, 1913. Serial No. 778,576.

*To all whom it may concern:*

Be it known that I, FREDERICK D. LARABEE, a citizen of the United States, residing in Hutchinson, in the county of Reno and State of Kansas, have invented new and useful Improvements in Methods of Treating Flour, of which the following is a specification.

My invention relates to a method of treating flour whereby to increase its absorptive quality, to increase its digestibility, and to enable a whiter baked product to be made from the flour. As an incident to the method, more loaves of bread per barrel can be made with flour treated according to my method than with the same amount of flour not so treated.

The method consists in treating ordinary flour in such manner as to rupture, bruise, or otherwise impair the integrity of the starch cells so as to render them permeable and accessible to the action of moisture.

The method is effected by passing ordinary flour between rotating plates, burs, or rolls, of hard material, and further reducing it to such an extent that the cellulose walls of the starch cells are broken down.

This method may be practised, with appropriate modifications, as a continuation of the ordinary milling process, wherein, by a system of gradual reduction, the edible portion of the wheat berry is reduced to the granular consistency of flour; but, I prefer to practice my method as a separate part of the milling operation, to the extent, at least, of employing disk-grinders, or mills, in place of rolls. In these disk-grinders the grinding members are of metal in the form of disks, having their opposing faces suitably ridged to afford grinding surfaces. Such mills are comparable in many respects to the old stone bur mill; but they are not employed in modern mills, so far as I am aware, for the grinding of wheat to flour. I have found, however, that by their use I can secure a maximum rubbing action and a minimum grinding action. This rubbing action is sufficient by pressure and friction to break down the starch cells, but it does not materially further reduce the granulation of the flour. The invention, nevertheless, is not limited to the use of such disk mills; but where other grinding members are employed, such as rolls, I would so regulate their differential speed as in all cases to procure substantially a rubbing, as distinguished from a grinding or reducing, action.

The rupturing of the starch cellulose walls allows water, when mixed with the flour, to come in direct contact with the amylose material in the interior of the starch cell. This material has a strong affinity for water, and when flour is treated as above it causes the flour to absorb more water with the result that a given amount of flour will make more dough than the same amount of flour that has not been so treated. Since the dough does not lose, in baking, more moisture than the ordinary dough, a barrel of flour so treated will make more loaves of baked bread than a like amount of flour not so treated; and every loaf made from the treated flour will be approximately of the same weight, texture and volume as if made from the untreated flour, and will remain moist longer.

As is well-known, the starch content of ordinary wheat flour is very nearly indigestible by reason of the fact that it is inclosed in a shell of cellulose which is, to a large extent, impermeable to moisture of any kind. By breaking down these cellulose walls of the starch not only is the starch acted on by the water mixed with the flour, and the starch itself incorporated with and made an integral part of the dough, but the digestive juices can have access to the interior of the starch cell and reduce the starch and render it more easily assimilated by the system, thus increasing the food value of the flour.

It should perhaps be emphasized that while by my method the absorptive quality of the flour is increased, this does not merely mean that the water content of the dough or bread is greater than that which would obtain with flour not treated by my method; for, while the water content is increased, this is due to the fact that more material has been offered to the action of the water. In other words, in ordinary flour a certain proportion is unacted upon by moisture and is practically inert material. By my method this portion of the flour is caused to be acted on by the water in the same way as every other particle of the flour, and such portion is rendered valuable as a food constituent of the flour.

As a further advantage of my method I find that it makes the flour whiter, and bread made from such flour will accordingly be whiter in color than bread made from the ordinary flour.

By referring in the specification to the further reduction of the flour, I wish it understood that I do not thereby mean merely grinding the flour finer. Flour ground as fine as practicable for commercial use will still show, when mixed with water and viewed through a microscope, its starch cells unimpaired. To further grind this flour, that is to make it, to any material extent, of a still finer granulation, would be impracticable, as the product would be unsalable. The reduction I refer to, therefore, is such a reduction as will not, to any material extent, further reduce the granulation of the flour, but will, owing to the different character of mechanical action employed from that used in granulating the flour, act to disintegrate or tear apart the starch cells without materially affecting the granulation of the flour proper.

I claim:

1. The method of treating ordinary flour which consists in further mechanically acting upon the same in the dry state to break down the starch cells thereof.

2. The method of treating ordinary flour which consists in further mechanically acting upon the same in the dry state to break down the starch cells thereof, without materially affecting the granulation of the flour.

3. The herein described method which consists in reducing wheat to flour, and then mechanically breaking down the starch cells of the dry flour.

4. The herein described method which consists in reducing wheat to flour, and then mechanically breaking down the starch cells of the dry flour without materially affecting the granulation thereof.

5. The method of treating flour which consists in subjecting the same in the dry state to mechanical reducing agents yielding a maximum rubbing and a minimum grinding action, whereby to break down the starch cells without materially affecting the granulation of the flour.

6. The method of treating ordinary flour which consists in further acting upon the same in the dry state by mechanical pressure to break down the starch cells thereof.

7. The method of treating ordinary flour which consists in further acting upon the same in the dry state by mechanically disrupting the starch cells thereof with the accompaniment of pressure.

In testimony whereof, I have hereunto set my hand in presence of two subscribing witnesses.

FREDERICK D. LARABEE.

Witnesses:
BRUCE S. ELLIOTT,
STELLA HILL.